United States Patent Office 3,522,099
Patented July 28, 1970

3,522,099
CELL FOR STORING ELECTRICAL ENERGY BY ELECTROLYSIS OF WATER AND FOR RECOVERING THE WATER BY ELECTROCHEMICALLY RECOMBINING THE HYDROGEN AND OXYGEN FORMED BY THE ELECTROLYSIS
Rolf Winfried Schulte, Erlangen, and Heiner Dittmann, Munich, Germany, assignors to Siemens Aktiengesellschaft, Berlin and Munich, and Varta Aktiengesellschaft, Frankfurt am Main, Germany, both corporations of Germany
Filed July 11, 1967, Ser. No. 652,455
Claims priority, application Germany, July 12, 1966, S 104,749
Int. Cl. H01m 27/14
U.S. Cl. 136—86          16 Claims

ABSTRACT OF THE DISCLOSURE

Cell for storing electrical energy by electrolysis of water and recovering the water by current-producing recombination of the hydrogen and oxygen formed by the electrolysis includes a valve electrode for selectively separating and dissolving hydrogen and a gas diffusion electrode for dissolving oxygen in the electrolyte, said electrodes defining an electrolyte chamber therebetween, and an ion-permeable oxygen-separating electrode disposed in said electrolyte chamber. A storage battery formed of a plurality of the abovementioned cells wherein respective two hydrogen valve electrodes and two oxygen-recombining electrodes of adjacent cells connected electrically in parallel are united into an electrode operating on both sides.

---

Our invention relates to a cell for storing electrical energy by the electrolysis of water and recovery of the water by the current-producing recombination of the hydrogen and oxygen formed by the electrolysis of the water.

From Pat. No. 3,201,282 of E. Justi et al., it has become known that with the aid of so-called valve electrodes the gases produced by the electrolysis of water can be separated and stored. In this manner, the collected gases are compressible to a superpressure of several atmospheres relative to the electrolyte which is maintained under atmospheric pressure. Valve electrodes are respectively formed of a coarsely porous, highly active operating layer at which the precipitation of the gas takes place, and a finely porous cover layer facing the electrolyte. The cover layer is suitably formed of electrically conducting materials which possess a high overvoltage for the gas that is to be separated, so that under given conditions gas cannot develop at the cover layer. In hydrogen valve electrodes, copper, for example, is well suited for the cover layer material. DSK material which consists of a skeleton of carbonyl nickel in which Raney nickel is embedded is advantageously used as the highly active material of the operating layer in hydrogen valve electrodes. It is noteworthy, regarding such hydrogen electrodes, that they are extremely suitable both for separating as well as for recombining the hydrogen, that is, they can be used in cells wherein both the electrolysis as well as the ensuing cold combustion of the gases, which are formed, are carried out.

As a rule, valve electrodes can be employed as oxygen electrodes in storage cells. However, in selecting the operating layer material difficulties arise, since optimum properties required both for electrochemical separation and recombination of the oxygen are not placed in combination in a single material. For example, Raney nickel is particularly well suited due to its slight polarization for use in effecting oxygen separation; it is, however, not suitable to the same extent for the purpose of effecting oxygen recombination. The electrochemical recombination of oxygen, as is well known, is catalyzed much better with silver than with nickel. In order to combine the advantages of nickel and silver in one electrode of a fuel cell, it has been suggested in German Pat. No. 1,200,903 to employ Raney nickel and Raney silver in the form of DSK material in the oxygen electrode. A disadvantage of such electrodes, however, is that in spite of the low oxygen overvoltage with nickel, when carrying out oxygen separation, silver is dissolved in the alkali electrolyte and the durability of the electrode is thereby considerably impaired. To prevent the silver from dissolving, it has therefore also been suggested in explosive-gas fuel cells that hydrogen electrodes operating on two sides be employed with oxygen electrodes disposed on both sides thereof, one of the oxygen electrodes containing nickel and the other silver. According to this proposal, the electrodes are to be constructed as valve electrodes. If the silver-bearing electrode in such a cell is then operated exclusively as oxygen cathode, the undesirable dissolving of the silver in the electrode is thus avoided.

The foregoing known method, however, has the disadvantage that the two-sided hydrogen valve electrode is only employed to half of its capacity and consequently not to its optimum capacity during the electrolysis and the recombination of the stored gases, respectively. In the first-mentioned case, one side of the hydrogen electrode cooperates with the nickel-bearing oxygen electrode located opposite that side, whereas the other side of the hydrogen electrode and the silver-bearing oxygen electrode are not subjected to the load. In the second-mentioned case, the other side of the hydrogen electrode cooperates with the silver-bearing oxygen electrode located opposite that other side, whereas the first-mentioned side of the hydrogen electrode with the nickel-bearing oxygen electrode are not operating at optimum capacity because nickel is not the most suitable catalyst for use in the last-mentioned operation. This mode of operation has disadvantageous consequences for the cost and the power output of the fuel cell installation.

It is accordingly an object of our invention to provide a cell for storing electrical energy by electrolyzing water and to recovery the water by recombining the hydrogen and oxygen formed from the electrolysis of the water so as to thereby produce an electric current, which avoids the aforementioned disadvantages of the heretofore known cells of this general type, and which more specifically considerably reduces the cost and considerably improves output and efficiency of the cell over those of heretofore known cells of that type.

With the foregoing and other objects in view, we provide a cell of the aforementioned type which comprises a valve electrode for selectively separating hydrogen and redissolving hydrogen in the electrolyte of the cell, an oxygen dissolving electrode spaced from the hydrogen valve electrode and defining therebetween an electrolyte chamber therebetween, and an ion-permeable oxygen-separating electrode disposed in the electrolyte chamber.

In accordance with further features of our invention, the oxygen-separating electrode can be formed of a metal net or perforated metallic plate having a surface which is activated by a suitable pretreatment. An example of the pretreatment is the spraying of a powder consisting of an aluminum-nickel alloy with the aid of a plasma jet on the surface of the net or perforated plate and thereafter dissolving out the aluminum with potassium hydroxide. During this pretreatment care must be taken to absolutely prevent the openings in the net or the perforated plate from becoming closed, because ion transfer through the electrode would otherwise become impossible. The size and number of the openings is preferably selected so that the resistance of the electrode during the recombination of the stored gases wherein the oxygen-separating electrode substantially acts as a diaphragm remains small.

In accordance with another feature of our invention and more specifically in a preferred embodiment thereof, a waffle plate provided with perforations is employed as the oxygen separating electrode. By means of such an electrode both ion passage as well as electrolyte circulation perpendicular thereto, and the maintenance of the spacing between the hydrogen valve electrode and the oxygen-dissolving electrode necessary to form the electrolyte chamber are relatively easily afforded. Additional nets can be disposed at both sides of the oxygen-separating electrode for supporting particularly unstable copper layers. In the case of metal cover layers, they must be inlaid in plastic material to prevent a short circuit.

In accordance with further features of our invention, we advantageously employ as catalyst carrier of the oxygen-separating electrode a KOH-resistant material, such as nickel, particularly. However, nets of plastic material or skeletons or PVC (polyvinyl chloride), polyamides, and the like are also suitable.

In accordance with yet further features of our invention, electrodes suitable for the aforementioned purpose are employed as hydrogen valve electrode and gas diffusion electrode. The operating layer of the hydrogen valve electrode consists of Raney nickel and the gas diffusion electrode for dissolving the oxygen consists of Raney silver. In order to be able to adjust the three-phase boundary necessary to produce electric energy, the oxygen-dissolving electrode is also constructed as a double-layer electrode wherein the finely porous cover layer consists either of metal or of a non-conductive material. The use of asbestos paper has proven particularly suitable for this purpose.

Other features which are considered as characteristic for the invention are set forth in the appended claims.

Although the invention is illustrated and described herein as cell for storing electrical energy by electrolysis of water and for recovering the water by electrochemically recombining the hydrogen and oxygen formed by the electrolysis, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
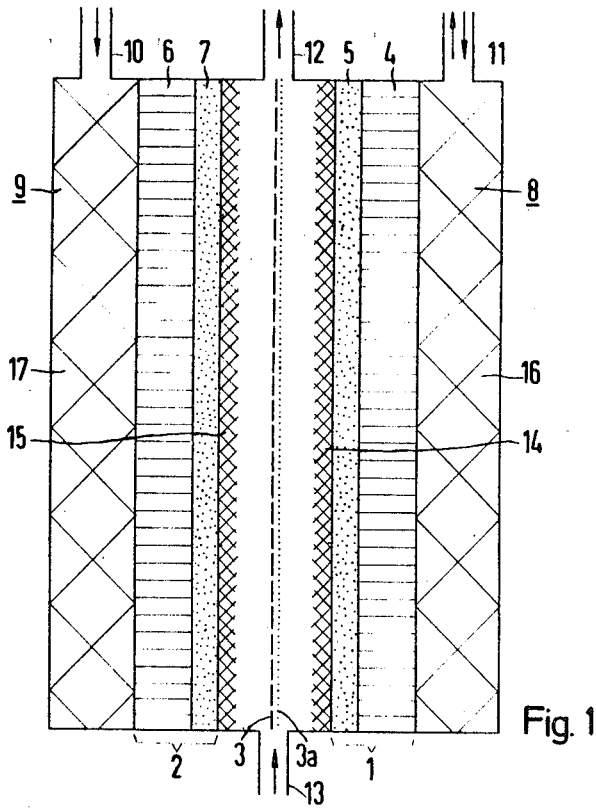
FIG. 1 is a diagrammatic view of a fuel cell constructed in accordance with our invention, showing three electrodes disposed therein.

Referring now to the drawings and first particularly of FIG. 1 thereof, there is shown a storage cell constructed in accordance with our invention having three electrodes: a hydrogen valve electrode 1 and oxygen-dissolving electrode 2 and oxygen-separating electrode 3. The hydrogen valve electrode 1 is formed of a coarsely porous operating layer 4 and a finely porous cover layer 5, and the oxygen-dissolving electrode 2 is correspondingly formed of a coarsely porous operating layer 6 and a finely porous cover layer. The oxygen-separating electrode 3 consists either of the nickel netting or of a perforated nickel plate. The surface of the oxygen-separating electrode is preferably activated by coating it with a Raney nickel layer 3a. A hydrogen chamber 8 is located adjacent the hydrogen valve electrode 1 and an oxygen gas chamber 9 is located adjacent the oxygen dissolving electrode 2. Oxygen is supplied to the gas chamber 9 through duct 10. Oxygen formed during the electrolysis of water within the cell is discharged with the electrolyte from a chamber located between the electrodes 1 and 2 through duct 12. Hydrogen is supplied and discharged through duct 11, and electrolyte is supplied to the electrolyte chamber of the cell through tube 13.

Supporting nets 14 and 15 are located within the electrolyte chamber adjacent the respective electrodes 1 and 2. In those cases where the cover layers 5 and 7 of the respective electrodes 1 and 2 are of electrically conductive material such as copper, for example, the supporting nets 14 and 15 should consist of non-conductive plastic material. The nets 14 and 15 need be built in only when copper layers are used which are of limited mechanical stability, such as asbestos paper, for example. If working layers of pulverulent matrial instead of compact, i.e. compressed working layers are employed in the electrodes, then the distributed layers of loose particles are supported with fine and coarse nets 16, 17 of metal or plastic material, the coarse nets simultaneously thereby assuring the maintenance of the gas chambers in the cells when batteries of the cells are assembled.

Figure 2:
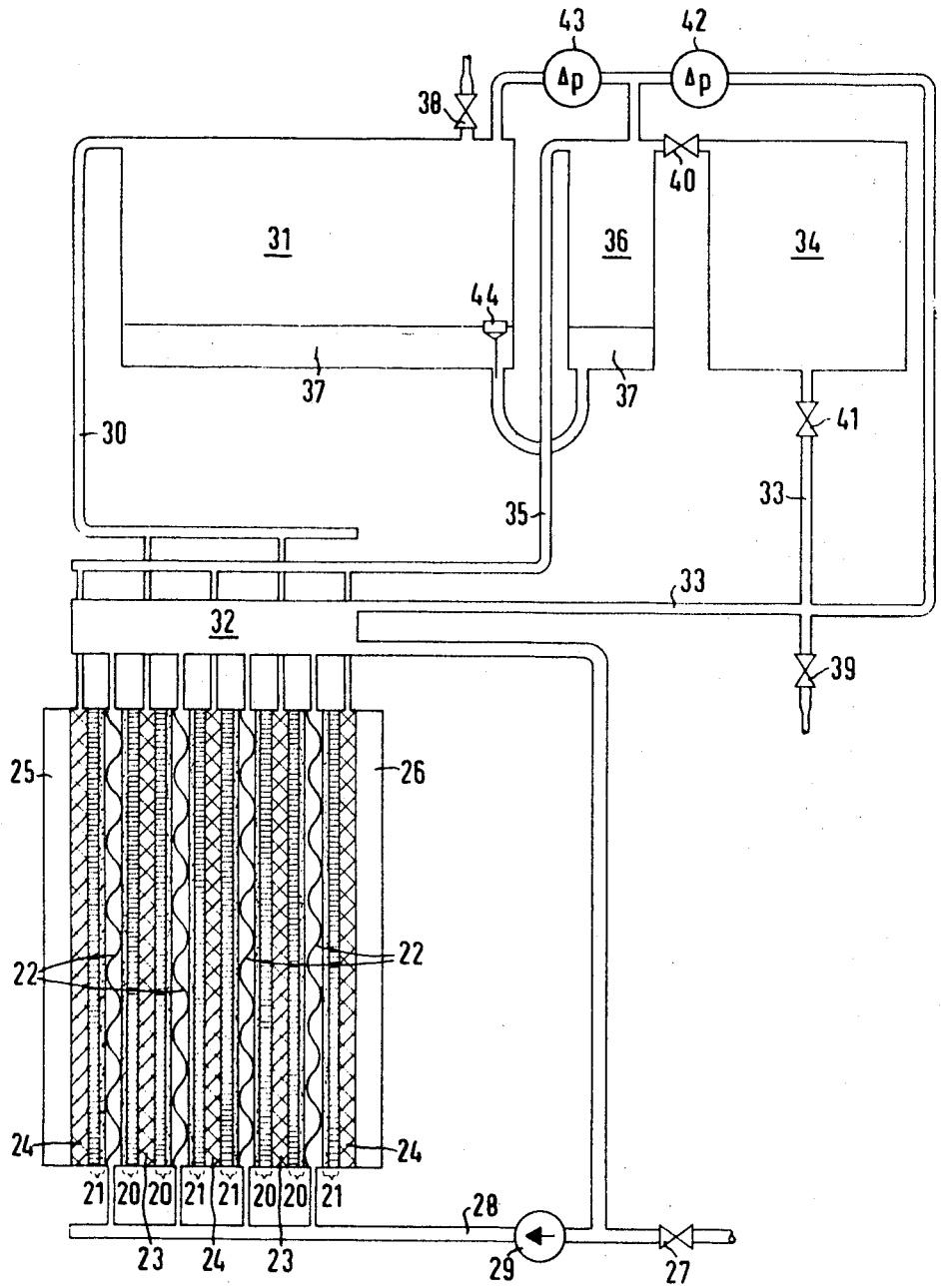
FIG. 2 is a diagrammatic view of a storage battery consisting of a plurality of the cells of FIG. 1 and the gas supply and discharge system associated therewith.

The operation of the storage battery comprised of fuel cells according to our invention is evident from FIG. 2. In the schematic view of FIG. 2, there are shown the hydrogen electrodes 20, the oxygen-dissolving electrodes 21 and the oxygen-separating electrodes 22. The electrodes 20 and 21 comprise, as in the embodiment of FIG. 1, respectively, an operating layer and a cover layer. A hydrogen gas chamber 23 and an oxygen gas chamber 25 are also shown in FIG. 2 and are respectively related in common to two similar electrodes. Such an arrangement is particularly suitable for electrically parallel connection of several cells.

If the cells of the battery are connected electrically in series, the nets employed as supporting skeletons or frames in gas chamber 23 and 24 must consist of insulating material. Electrical series connection of the cells can also be effected so that a hydrogen valve electrode is combined respectively with an oxygen-dissolving electrode and the common gas chamber can be divided by a metal plate or a gastight plate into two gas chambers. By using metal plates as partitions they can, together with the metal supporting nets, produce the electrical contact so that bipolar electrodes as shown in FIG. 3 are thereby formed.

Figure 3:
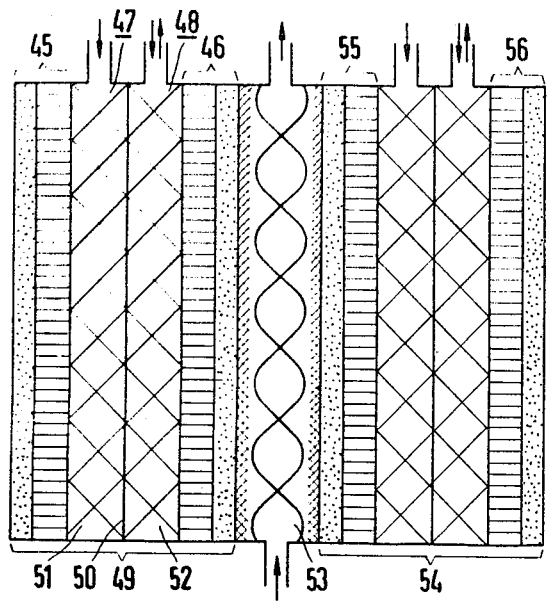
FIG. 3 is a diagrammatic view of a bipolar electrode constructed in accordance with our invention.

In FIG. 3, there is illustrated a bipolar electrode 49 comprising an oxygen-dissolving electrode 45, a hydrogen valve electrode 46, and two gas chambers 47 and 48. The gas chambers 47 and 48 are separated from one another by a metal plate 50 and contain metal supporting nets 51 and 52. An oxygen-separating electrode 53 according to FIG. 1 and a second bipolar electrode 54 comprising an oxygen-dissolving electrode 55 and hydrogen valve electrode 56 are also shown in FIG. 3.

Referring once again to FIG. 2, there are shown two pressure plates 25 and 26 forming end closures of the battery which hold the cells together by means of non-illustrated tension anchors or bolts. The electrolyte passes through a valve 27 into the duct 28 and is circulated periodically or continually by a pump 29. Hydrogen formed by electrolysis is passed through conduit 30 out of the gas chamber 23 of the hydrogen valve electrode 20 into a pressure vessel 31; oxygen simultaneously formed at the oxygen-separating electrode 22 during the electrolysis operation is conducted together with the electrolyte into a gas separator 32 and passes therefrom through the conduit 33 into the pressure vessel 34. The gas chamber 24 of the oxygen dissolving electrode 21 is connected by the conduit 35 with the vessel 36 which is in turn connected with the vessel 31 through the blocking liquid 37. When gases are stored, the valves 38, 39 and 40 are closed and the valve 41 is open. When the hydrogen pressure in the vessel 31 increases, the air or oxygen in the vessel 36 is similarly compressed by the blocking liquid 37 so that the gas chamber of the hydrogen valve electrodes and the oxygen-dissolving electrodes constantly remain under substantially the same pressure. This pressure is compared with the pressure in the electrolyte chamber 32 with the aid of the differential pressure measuring instrument 42. It must be respectively greater than the pressure in the electrolyte chamber and for most electrodes is about 0.2 to 1 atmospheres. If the pressure difference varies from the known values in one or the other direction, the valve 38 or 39 is momentarily opened by means of a regulating device until the nominal value is again reset. The pressures in the vessels 31 and 36 are compared with the aid of the differential pressure measuring instrument 42. If the overpressure is formed in the vessel 31 because the floating vessel 44 closes the connecting duct between the vessels 31 and 36, the valve 38 is then automatically open. The floating valve 44 serves to prevent passage of the hydrogen out of the vessel 31 into the vessel 36, which might be the case for example, if blocking liquid were not sufficient for compressing the oxygen in the vessel 36.

If the above-described equipment for recovering the electrical energy is actuated, the valve 41 is then closed and the valve 40 is opened. The pressure of the oxygen accumulated in the oxygen pressure vessel 34 is thereby compared to the pressure of the hydrogen in the vessel 31. By means of the differential pressure measuring instrument 42, such as a manometer, the pressure difference resulting from the use of the gases between the gas chambers 34, 36 and 31 on the one hand and the electrolyte chamber 32 on the other hand is further controlled. The pressure difference between the gas chamber and the electrolyte chamber is important for proper functioning of the gas diffusion and the valve electrodes. If the electrolyte chamber is under atmospheric pressure, the storage of the gases has only been possible heretofore up to an absolute pressure of 4 atmospheres when employing two valve electrodes, a hydrogen and an oxygen valve electrode. When using the apparatus of the invention in the instant application with an oxygen-separating electrode in the electrolyte chamber, both the gas chambers and the electrolyte chamber are subjected to increasing pressure during the electrolysis operation, whereby the necessary pressure difference between the gas chambers and the electrolyte chamber is maintained. Quite contrariwise, when stored gases are recombined, the pressure in the gas chambers slowly reduces until the gases are completely used up, whereby by valve control the pressure in the electrolyte chamber, again while maintaining the required pressure difference in the gas chambers, also reduced. It is therefore furthermore noteworthy that with the aid of the invention of the instant application, storage of the gases is possible at a considerably higher absolute pressure than heretofore, whereby in contrast to normal pressure electrolysis the same equipment also carries out the recombination of the gases while supplying electrical energy.

Figure 4:
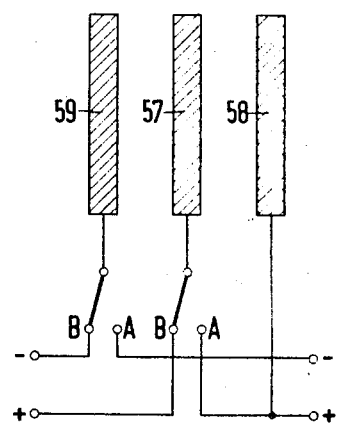
FIG. 4 is a circuit diagram for the storage cell of FIG. 1.

In FIG 4, an electrical circuit is shown for the storage cell illustrated in FIG. 1 and includes an oxygen anode 57, an oxygen cathode 58 and a valve electrode 59 for both separating and dissolving hydrogen. When the switches, as illustrated, are connected to the contacts 13, the storage cells are then operated as electrolytical cells. When the switches are shifted so as to engage the contacts A, the cell is now operable as a fuel cell.

We claim:

1. A cell for storing electrical energy by electrolyzing water and for releasing electrical energy by recombining the hydrogen and oxygen formed by the electrolysis, comprising a hydrogen electrode for selectively evolving hydrogen electrolytically from and dissolving hydrogen in an electrolyte, said hydrogen electrode having a catalytically active porous operating layer and a catalytically inactive porous cover layer, the average pore radius of said cover layer being smaller than the average pore radius of said operating layer, an oxygen diffusion electrode for dissolving oxygen in the electrolyte, said electrodes defining a chamber therebetween for containing the electrolyte, and an ion-permeable oxygen-evolving electrode disposed in said electrolyte chamber between said hydrogen electrode and said oxygen diffusion electrode for evolving oxygen electrolytically from the electrolyte, said hydrogen electrode being electrically connectible selectively to one of said oxygen diffusion and ion-permeable electrodes at a time.

2. A cell according to claim 1 wherein said oxygen-evolving electrode comprises a sheet-like structure consisting of nickel and formed with a multiplicity of apertures therein and an activating layer of Raney-nickel on the surface thereof.

3. A cell according to claim 2 wherein said sheet-like structure is in the form of a net.

4. A cell according to claim 2 wherein said sheet-like structure is in the form of a perforated plate.

5. A cell for storing electrical energy by electrolyzing water and for releasing electrical energy by recombining the hydrogen and oxygen formed by the electrolysis, comprising a valve electrode for selectively separating hydrogen out of and dissolving hydrogen in an electrolyte, a gas diffusion electrode for dissolving oxygen in the electrolyte, said electrodes defining a chamber therebetween for containing the electrolyte, and an ion-permeable oxygen-separating electrode disposed in said electrolyte chamber, said oxygen- separating electrode comprising a skeleton of plastic material and an activating layer of Raney-nickel located on the surface thereof.

6. A cell for storing electrical energy by electrolyzing water and for releasing electrical energy by recombining the hydrogen and oxygen formed by the electrolysis, comprising a valve electrode for selectively separating hydrogen out of and dissolving hydrogen in an electrolyte, a gas diffusion electrode for dissolving oxygen in the electrolyte, said electrodes defining a chamber therebetween for containing the electrolyte, and an ion-permeable oxygen-separating electrode disposed in said electrolyte chamber, said oxygen-separating electrode comprising a net of plastic material and an activating layer of Raney-nickel disposed on the surface thereof.

7. A cell for storing electrical energy by electrolyzing water and for releasing electrical energy by recombining the hydrogen and oxygen formed by the electrolysis, comprising a valve electrode for selectively separating hydrogen out of and dissolving hydrogen in an electrolyte, a gas diffusion electrode for dissolving oxygen in the electrolyte, said electrodes defining a chamber therebetween for containing the electrolyte, and an ion-permeable oxygen-separating electrode disposed in said electrolyte chamber, said oxygen-separating electrode comprising a base structure formed with a multiplicity of apertures therein and an activating cover layer of Raney-nickel disposed on the surface of said base structure, and further comprising a metal net located adjacent said cover layer and in engagement therewith so as to support said cover layer.

8. A cell for storing electrical energy by electrolyzing water and for releasing electrical energy by recombining the hydrogen and oxygen formed by the electrolysis, comprising a valve electrode for selectively separating hydrogen out of and dissolving hydrogen in an electrolyte, a gas diffusion electrode for dissolving oxygen in the electrolyte, said electrodes defining a chamber therebetween for containing the electrolyte, and an ion-permeable oxygen-separating electrode disposed in said electrolyte chamber, said oxygen-separating electrode comprising a base structure formed with a multiplicity of apertures therein and an activating cover layer of Raney-nickel disposed on the surface of said base structure, and further comprising a net of electrically insulating material located adjacent said cover layer and in engagement therewith for supporting said cover layer.

9. A cell for storing electrical energy by electrolyzing water and for releasing electrical energy by recombining the hydrogen and oxygen formed by the electrolysis, comprising a valve electrode for selectively separating hydrogen out of and dissolving hydrogen in an electrolyte, a gas diffusion electrode for dissolving oxygen in the electrolyte, said electrodes defining a chamber therebetween for containing the electrolyte, and an ion-permeable oxygen-separating electrode disposed in said electrolyte chamber, said hydrogen valve electrode having a coarsely porous operating layer of Raney-nickel and a finely porous cover layer of electrically nonconductive material.

10. A cell for storing electrical energy by electrolyzing water and for releasing electrical energy by recombining the hydrogen and oxygen formed by the electrolysis, comprising a valve electrode for selectively separating hydrogen out of and dissolving hydrogen in an electrolyte, a gas diffusion electrode for dissolving oxygen in the electrolyte, said electrodes defining a chamber therebetween for containing the electrolyte, and an ion-permeable oxygen-separating electrode disposed in said electrolyte chamber, said hydrogen valve electrode having a coarsely porous operating layer of Raney-nickel and a finely porous cover layer of electrically conductive material having a hydrogen over-voltage of such high value that no appreciable hydrogen separation can occur.

11. A cell for storing electrical energy by electrolyzing water and for releasing electrical energy by recombining the hydrogen and oxygen formed by the electrolysis, comprising a valve electrode for selectively separating hydrogen out of and dissolving hydrogen in an electrolyte, a gas diffusion electrode for dissolving oxygen in the electrolyte, said electrodes defining a chamber therebetween for containing the electrolyte, and an ion-permeable oxygen-separating electrode disposed in said electrolyte chamber, said oxygen dissolving electrode comprising an operating layer consisting of Raney-silver.

12. A battery of cells for storing electrical energy by electrolyzing water and for releasing electrical energy by recombining the hydrogen and oxygen formed by the electrolysis, comprising a valve electrode for selectively separating hydrogen out of and dissolving hydrogen in an electrolyte, a gas diffusion electrode for dissolving oxygen in the electrolyte, said electrodes defining a chamber therebetween for containing the electrolyte, and an ion-permeable oxygen-separating electrode disposed in said electrolyte chamber, the hydrogen valve electrodes and the oxygen dissolving electrodes respectively of a pair of adjacent cells connected electrically in parallel being united into a two-sided operating electrode.

13. A battery of cells for storing electrical energy by electrolyzing water and for releasing electrical energy by recombining the hydrogen and oxygen formed by the electrolysis, comprising a valve electrode for selectively separating hydrogen out of and dissolving hydrogen in an electrolyte, a gas diffusion electrode for dissolving oxygen in the electrolyte, said electrodes defining a chamber therebetween for containing the electrolyte, and an ion-permeable oxygen-separating electrode disposed in said electrolyte chamber, a pair of cells being connected electrically in series, the hydrogen valve electrodes and the oxygen dissolving electrodes respectively of said cells being united into two-sided operating electrodes, said two-sided operating electrodes being insulated electrically from one another.

14. A battery of cells for storing electrical energy by electrolyzing water and for releasing electrical energy by recombining the hydrogen and oxygen formed by the electrolysis, comprising a valve electrode for selectively separating hydrogen out of and dissolving hydrogen in an electrolyte, a gas diffusion electrode for dissolving oxygen in the electrolyte, said electrodes defining a chamber therebetween for containing the electrolyte, and an ion-permeable oxygen-separating electrode disposed in said electrolyte chamber, a pair of the cells being connected electrically in series, the hydrogen valve electrodes and the oxygen dissolving electrodes respectively, of said cells being united in a bipolar electrode, gas chambers located in said cells adjacent said united electrodes, and a metal plate for effecting electrical contact separating said gas chambers from one another.

15. A battery according to claim 14 wherein at least one of said pairs of electrodes comprises base structures and cover layers respectively of Raney-metal, and including supporting nets of metal located adjacent and in engagement with said cover layers, said supporting nets forming electrical contact with said metal plate.

16. A system for operating a battery of cells according to claim 14, comprising a first pressure vessel connected to the gas chamber adjacent said hydrogen valve electrode for storing hydrogen, a second pressure vessel connected to the gas chamber adjacent said oxygen dissolving electrode, liquid blocking means interconnecting said first and second pressure vessels, a third pressure vessel connected to a gas chamber for said cells located adjacent said oxygen separating electrode for storing oxygen, means for connecting said second pressure vessel to said third pressure vessel and disconnecting said third pressure vessel from said oxygen separating gas chamber, upon switching the operation of said battery from electrical energy storage to electrical energy release.

References Cited

UNITED STATES PATENTS

| | | | |
|---|---|---|---|
| 2,070,612 | 2/1937 | Niederreither | 136—86 |
| 2,578,027 | 12/1951 | Tichenor | 136—6 |
| 3,098,802 | 7/1963 | Beer | 204—231 |
| 3,201,282 | 8/1965 | Justi et al. | 136—86 |
| 3,378,406 | 4/1968 | Rosansky | 136—86 |

FOREIGN PATENTS

| | | |
|---|---|---|
| 171,090 | 8/1905 | Germany. |
| 635,934 | 2/1962 | Canada. |

WINSTON A. DOUGLAS, Primary Examiner

M. J. ANDREWS, Assistant Examiner